(12) United States Patent
Kim

(10) Patent No.: US 8,428,824 B2
(45) Date of Patent: Apr. 23, 2013

(54) ANGLE CONTROL METHOD AND APPARATUS, AND AUTOMATIC PARKING SYSTEM USING THE SAME

(75) Inventor: Seong Joo Kim, Seongnam-si (KR)

(73) Assignee: Mando Corporation, Gyeonggi-do (KR)

( * ) Notice: Subject to any disclaimer, the term of this patent is extended or adjusted under 35 U.S.C. 154(b) by 327 days.

(21) Appl. No.: 12/957,983

(22) Filed: Dec. 1, 2010

(65) Prior Publication Data

US 2011/0137524 A1    Jun. 9, 2011

(30) Foreign Application Priority Data

Dec. 4, 2009    (KR) ........................ 10-2009-0119678

(51) Int. Cl.
| | |
|---|---|
| *A01B 69/00* | (2006.01) |
| *B62D 6/00* | (2006.01) |
| *B62D 11/00* | (2006.01) |
| *B62D 12/00* | (2006.01) |
| *B63G 8/20* | (2006.01) |
| *B63H 25/04* | (2006.01) |

(52) U.S. Cl.
USPC .............. 701/41; 701/36; 701/42; 340/932.2

(58) Field of Classification Search .................... 701/36, 701/41, 42, 49; 340/932.2; 280/761; 180/199
See application file for complete search history.

(56) References Cited

U.S. PATENT DOCUMENTS

| | | | | |
|---|---|---|---|---|
| 6,972,534 | B1 * | 12/2005 | Schulz et al. ............ | 318/400.02 |
| 7,431,117 | B2 * | 10/2008 | Ito ................... | 180/204 |
| 7,831,356 | B2 * | 11/2010 | Yabuguchi et al. ............. | 701/41 |
| 8,027,767 | B2 * | 9/2011 | Klein et al. ..................... | 701/42 |
| 2008/0167779 | A1 * | 7/2008 | Suzuki .......................... | 701/42 |
| 2010/0125391 | A1 * | 5/2010 | Yang .............................. | 701/41 |
| 2011/0113853 | A1 * | 5/2011 | Netzer ........................... | 73/1.77 |

* cited by examiner

*Primary Examiner* — Thomas Tarcza
*Assistant Examiner* — Rami Khatib
(74) *Attorney, Agent, or Firm* — McDermott Will & Emery LLP

(57) ABSTRACT

The present invention relates to a technology related to angle control and automatic parking, and more particularly to an angle control method and apparatus for improving angle control quality so as to make the movement of a steering handle smooth, and an automatic parking system using the same.

5 Claims, 4 Drawing Sheets

(a)

(b)

ANGLE CONTROL METHOD AND APPARATUS, AND AUTOMATIC PARKING SYSTEM USING THE SAME

CROSS-REFERENCE TO RELATED APPLICATION

This application claims priority from and the benefit of Korean Patent Application No. 10-2009-0119678, filed on Dec. 4, 2009, which is hereby incorporated by reference for all purposes as if fully set forth herein.

BACKGROUND OF THE INVENTION

1. Field of the Invention

The present invention relates to technologies related to angle control and automatic parking, and more particularly to an angle control method and apparatus for improving angle control quality so as to make the movement of a steering handle smooth, and an automatic parking system using the same.

2. Description of the Prior Art

A conventional angle control apparatus receives an input of a reference angle at each predetermined reference angle input period from a specific electronic control unit (hereinafter to be referred to as "ECU"), such as an automatic parking ECU, and conducts angle control at each predetermined control period, using the input reference angle.

At this time, since the control period for conducting angle control (e.g., 1 msec) is much shorter than the reference angle input period for receiving the input of a reference angle, the conventional angle control device suffers from a phenomenon that motor current is rapidly fluctuated in the vicinity of the reference angle input time while the angle control is being conducted by estimating the reference angle which is input much slower than the control period. If the motor current is rapidly fluctuated like this, there is a problem in that the motor is highly vibrated. Due to this, there is a problem in that the control quality is deteriorated, and hence the movement of a steering handle is not smooth, which increases a driver's dissatisfaction.

SUMMARY OF THE INVENTION

Accordingly, the present invention has been made to solve the above-mentioned problems occurring in the prior art, and an object of the present invention is to improve control quality and hence to make the movement of a steering handle smooth in such a manner that in conducting angle control required for steering by receiving an input of a reference angle from an electronic control unit (ECU) at each predetermined period, a reference angle, which is input in a step shape at each predetermined period, is calibrated into a smoothly changing shape, and the calibrated reference angle is used for angle control.

In order to accomplish this object, there is provided an angle control apparatus including: an input unit which receives an input of a reference angle at each reference angle input period; an angular velocity input unit which receives an input of an angular velocity calculated through a motor position sensor; a reference angle calibrating unit which calculates the length of time elapsed until the angular velocity is input after the reference angle is input, and then calculates a calibrated reference angle obtained by calibrating the reference angle on the basis of the angular velocity and the length of elapsed time; and an angle control unit 140 which conducts angle control on the basis of the calculated calibrated reference angle.

In accordance with another aspect of the present invention, there is provided an angle control method including: a reference angle input step for receiving an input of a reference angle at each reference angle input period; an angular velocity input step for receiving an input of an angular velocity calculated through a motor position sensor at each angular velocity input period; a reference angle calibrating step for calculating the length of time elapsed until the angular velocity is input after the reference angle is input, and then calculating a calibrated reference angle obtained by calibrating the reference angle on the basis of the angular velocity and the length of elapsed time; and an angle control step for conducting angle control on the basis of the calibrated reference angle.

In accordance with another aspect of the present invention, there is provided an automatic parking system including: an automatic parking electronic control unit which outputs a reference angle, which is a target steering angle for automatic parking, at each reference angle input period; and a steering electronic control unit which receives a reference angle, and receives angular velocity calculated through a motor position sensor at each angular input period, wherein the steering electronic control unit calculates the length of time elapsed until the angular velocity is input after the reference angle is input, calculates a calibrated reference angle obtained by calibrating the reference angle on the basis of the angular velocity and the reference angle, and conducts steering angle control on the basis of the calibrated reference angle.

As described above, according to the present invention, in conducting angle control required for steering by receiving an input of a reference angle at each period from an electronic control unit, a reference angle input in a step shape at each period is calibrated to a smoothly changing shape, and the calibrated reference angle is used for angle control, whereby the control quality can be improved, and hence the movement can of a steering handle can be made smooth.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
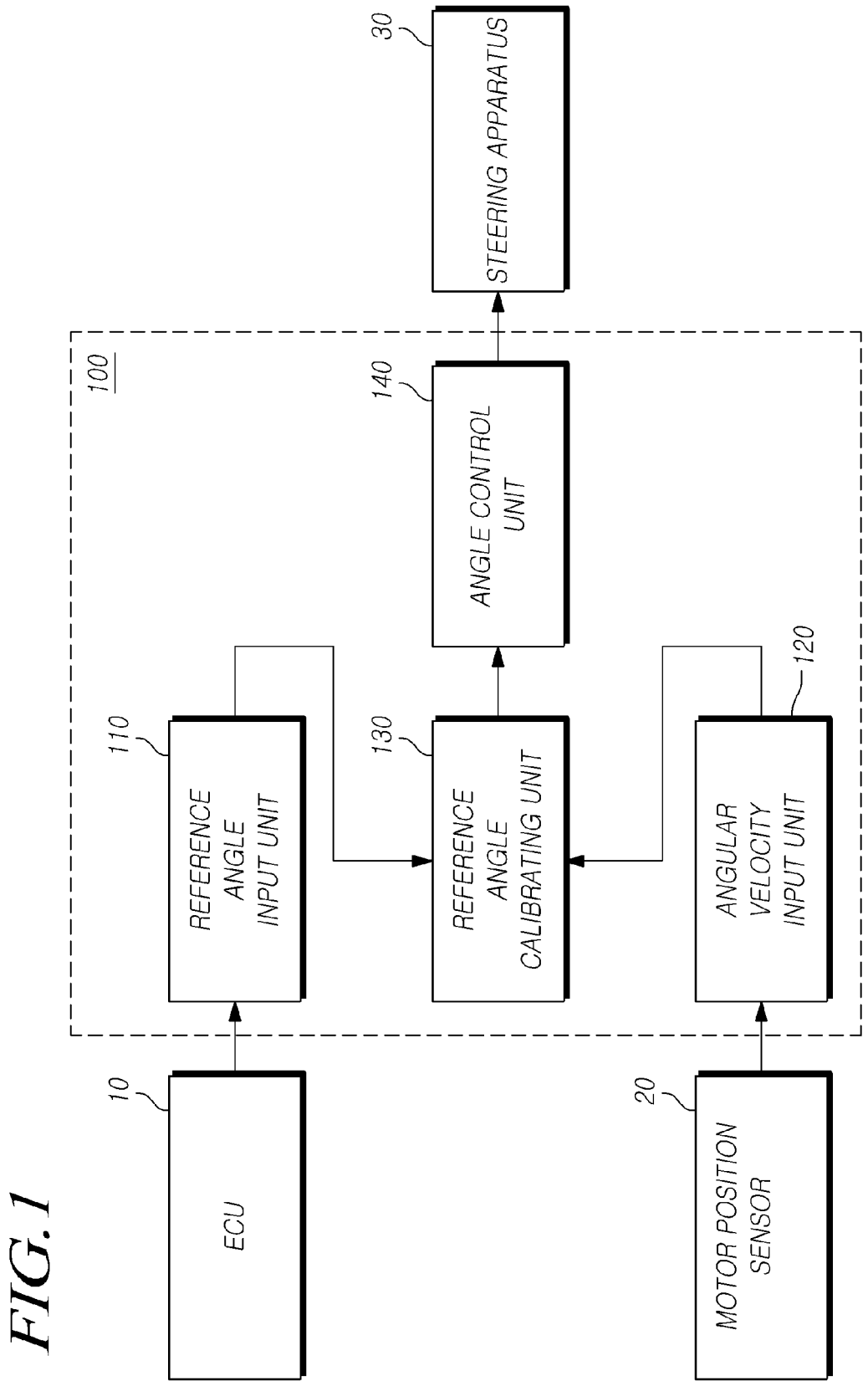
FIG. 1 is a block diagram for an angle control apparatus in accordance with an embodiment of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a block diagram for an angle control apparatus 100 in accordance with an embodiment of the present invention.

Referring to FIG. 1, the angle control apparatus 100 in accordance with an embodiment of the present invention includes: an input unit 110 which receives an input of a reference angle at each reference angle input period from an electronic control unit (hereinafter, to be referred to as "ECU") 10; an angular velocity input unit 120 which receives an input of an angular velocity calculated through a motor position sensor 20 at each angular velocity input period; a reference angle calibrating unit 130 which calculates the length of time elapsed until the angular velocity is input after the reference angle is input, and then calculates a calibrated reference angle obtained by calibrating the reference angle on the basis of the angular velocity and the length of elapsed time; and an angle control unit 140 which conducts angle control for a steering apparatus 30 at each control period on the basis of the calculated calibrated reference angle.

The reference angle calibrating unit 130 calculates a compensation reference angle for compensating the reference angle input from the ECU by multiplying the angular velocity calculated and input through the motor position sensor 20 and the calculated length of elapsed time (=angular velocity input time−reference angle input time), and calculates the calibrated reference angle by summing the reference angle input from the ECU 10 and the calculated compensation reference angle. That is, the reference angle calibrating unit 130 calculates the calibrated reference angle obtained by calibrating the reference angle input from the ECU 10, using Equation 1 set forth as below.

Calibrated reference angle=reference angle+angular velocity*length of elapsed time   Equation 1

The inventive angle control apparatus 100 described above with reference to FIG. 1 may be a steering ECU in a steering system, such as an MDPS (Motor Driven Power Steering), or a component included in such a steering ECU.

The reference angle input unit 110 included in such an angle control apparatus 100 may receive an input of a reference angle, which is a target steering angle for automatic parking, at each reference angle input period from the ECU (for example, an automatic parking ECU included in an automatic parking system for example).

The velocity input period for receiving an input angular velocity, and the control period for conducting angle control are calculated to be shorter than the reference angle input period for receiving an input reference by a predetermined value, on the basis of the angular velocity calculating velocity of the motor position sensor 20, and the angle control velocity of the angle control apparatus, respectively. In addition, the angular velocity period is set in accordance with the control period determined by the angle control velocity of the angle control apparatus 100. For example, the reference angle input period defined by the ECU is 20 msec, and the control period in accordance with the angle control velocity of the angle control apparatus 100 is 1 msec, wherein in order to calibrate the reference angle to be smoothly changed, the angular velocity input period may be set to be equal or almost equal to 1 msec which is the control period, considering the angular velocity calculating period which can be determined in accordance with the angular velocity calculating velocity in the motor position sensor 20.

Meanwhile, the angle control by the angle control unit 140 may be conducted at a much shorter control period (for example 1 msec) as compared to the reference angle input period (e.g., 20 msec) for receiving an input of a reference angle from the ECU 10. Accordingly, like the conventional angle control apparatus, if angle control is made using the reference angle, which is input in a non-smooth step shape at each reference angle input period from the angle control unit 140, as it is, there is a problem in that the quality of angle control is deteriorated and hence the movement of a steering handle following the angle control is not smooth, thereby increasing a driver's dissatisfaction.

Therefore, in order to solve the above-mentioned problems, the reference angle calibrating unit 130 of the inventive angle control apparatus receives an input of an angular velocity calculated through the motor position sensor 20 at each angular velocity input period (e.g., 1 msec) which is much shorter than the reference angle input period (e.g., 20 msec), wherein the reference angle calibrating unit 130 calibrates the reference angle input in a non-smooth shape at each reference angle input period to a smoothly changing shape using the input angular velocity, and calculates a calibrated reference angle, and the angle control unit 140 conducts angle control on the basis of the calibrated reference angle obtained by calibrating the reference angle in a smoothly changing shape, whereby the movement of a steering handle can be improved to be smooth, thereby improving a driver's satisfaction.

Figure 2:
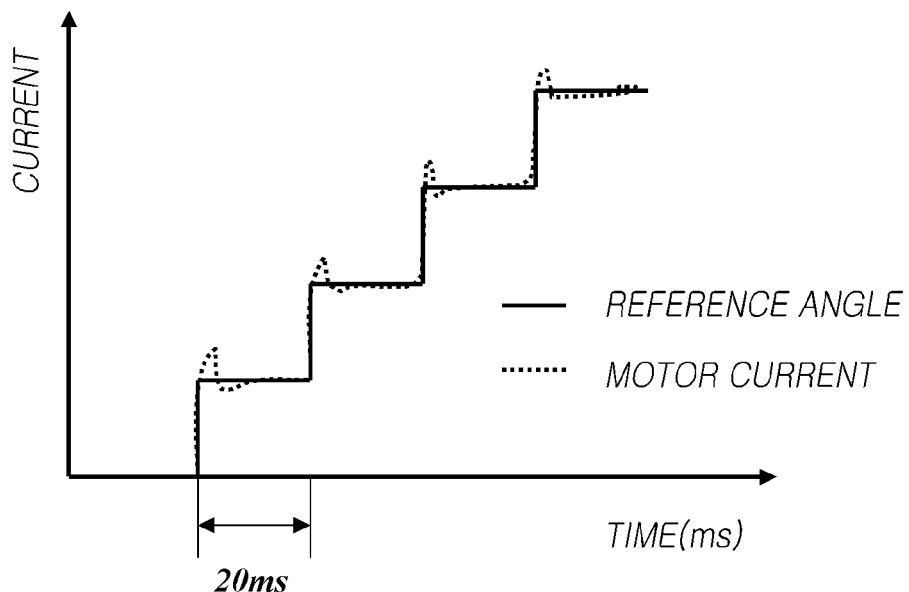
FIGS. 2a and 2b are graphs for describing an effect obtained through the calibration of a reference angle in accordance with an embodiment of the present invention.
Figure 2:
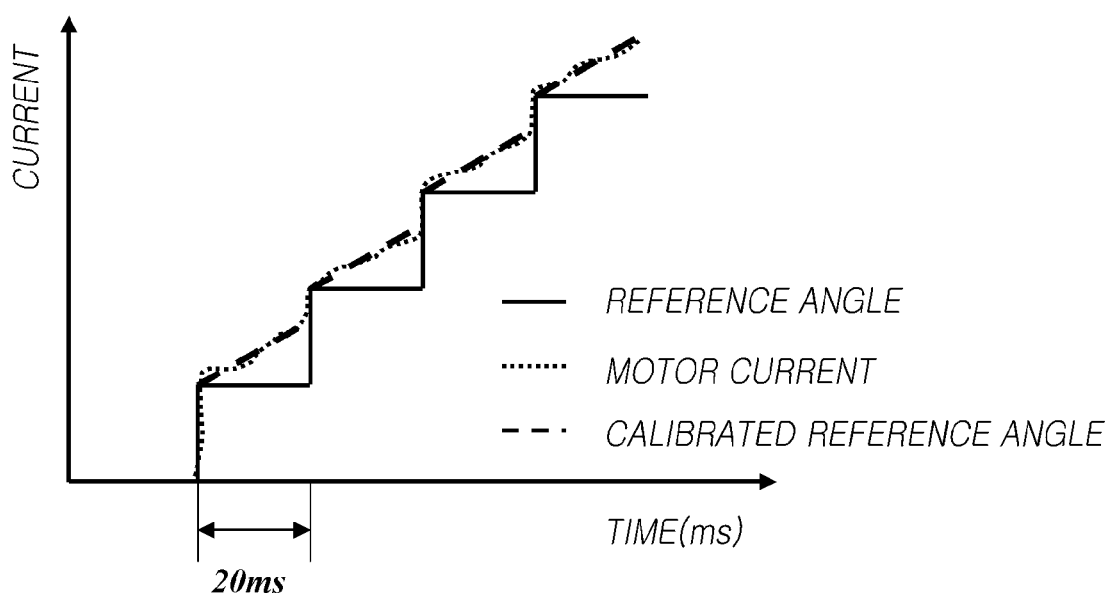

The problems caused by the above-mentioned conventional angle control apparatus, and effects obtained by the inventive angle control apparatus which can solve the problems of the conventional angle control apparatus will be described with reference to FIGS. 2a and 2b by way of an example. In FIGS. 2a and 2b, it is assumed that the ECU 10 inputs a reference angle to the angle control apparatus at each reference angle input period of 20 msec, the conventional angle control apparatus and the inventive angle control apparatus conduct angle control at a period of 1 msec which is much shorter than 20 msec, and the motor position sensor 20 inputs a calculated angular velocity to the inventive angle control apparatus 100 at each angular velocity input period of 1 msec.

Referring to FIG. 2a which is presented so as to describe the problems of the conventional angle control apparatus, if angle control is made following a reference angle which is input in a step shape at each reference angle input period of 20 msec from the ECU 10, motor current is rapidly fluctuated in the vicinity of a reference angle input time. If the motor current is rapidly fluctuated in this manner, the motor is highly vibrated, which deteriorates control quality and causes non-smooth movement of a steering handle.

Referring to FIG. 2b in comparison to FIG. 2a so as to describe effects obtained through the inventive angle control apparatus 100, since concerning a reference angle input at each reference angle input period of 20 msec, the inventive angle control apparatus 100 receives an input of a calculated angular velocity at an angular velocity input period of 1 msec from the motor position sensor 20, calibrates, on the input angular velocity, the previously input reference angle to a calibrated reference angle which is changed much more smoothly than a step shape before the next reference angle is input, and conducts angle control on the basis of the calibrated reference angle, it is possible to greatly reduce the phenomenon that motor current is rapidly fluctuated in the vicinity of the reference angle input time as shown in FIG. 2a, whereby the motor's vibration can be reduced, the control quality can be improved, and the movement of a steering handle can be made smooth.

Figure 3:
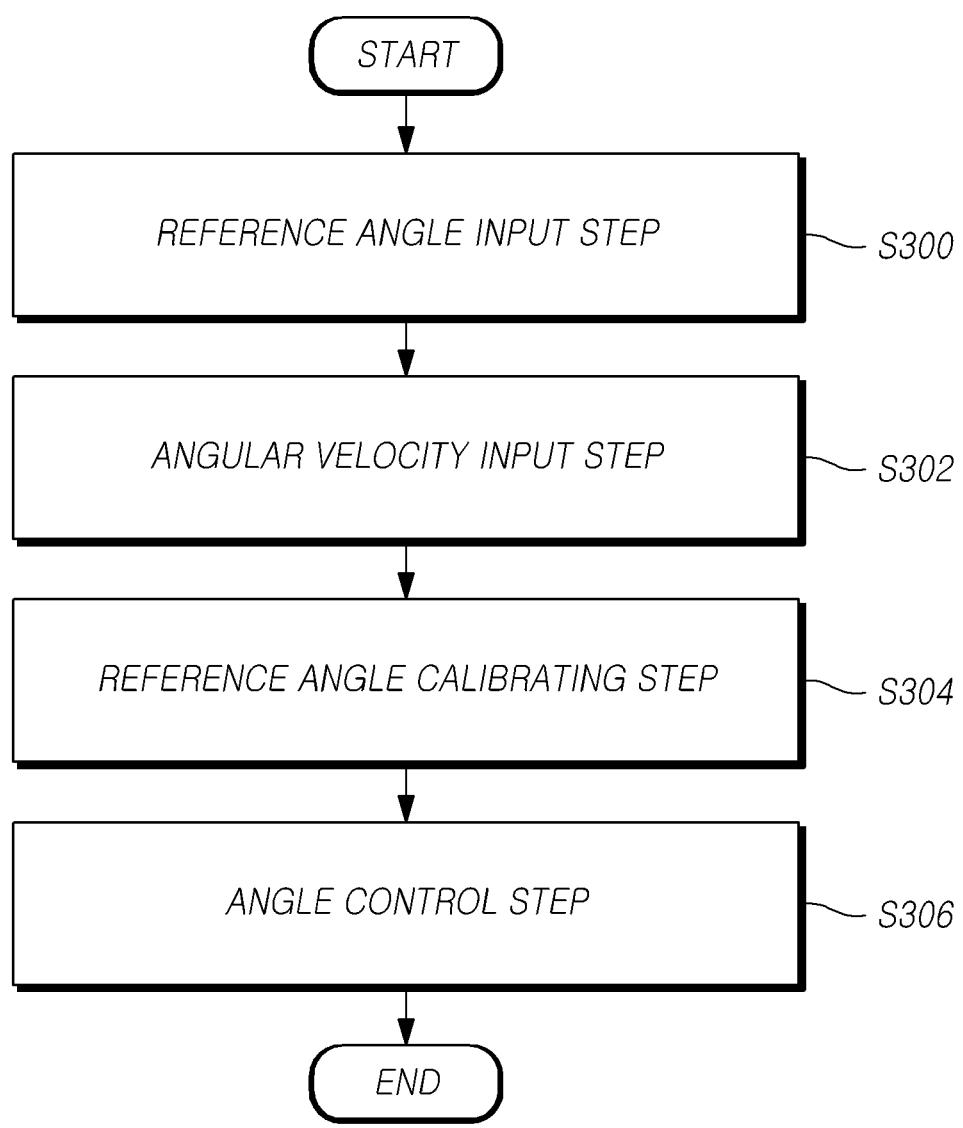
FIG. 3 is a flowchart for an angle control method in accordance with an embodiment of the present invention.

FIG. 3 is a flowchart for an angle control method in accordance with an embodiment of the present invention.

Referring to FIG. 3, the inventive angle control method includes: a reference angle input step for receiving an input of a reference angle at each reference angle input period from an ECU 10, such as an automatic parking ECU (S300); an angular velocity input step for receiving an input of an angular velocity calculated by a motor position sensor 20 at each angular velocity input period (S302); a reference angle calibrating step for calculating the length of time elapsed until the angular velocity is input after the reference angle is input, and then calculating a calibrated reference angle obtained by calibrating the reference angle input from the ECU 10 on the basis of the angular velocity and the length of elapsed time (S304); and an angle control step for conducting angle control at each control period on the basis of the calibrated reference angle (S306).

As described above, according to the inventive angle control apparatus and method, in conducting angle control required for steering by receiving an input of a reference angle at each period from the ECU, a reference angle input in a step shape at each period is calibrated to a smoothly changing shape and the calibrated reference angle is used for angle control, whereby the control quality can be improved, and hence a steering handle's movement can be made smooth.

The angle control method described above may be applied to an automatic parking system 400 which controls automatic parking through the cooperation of an automatic ECU 410 and a steering ECU 420.

Figure 4:
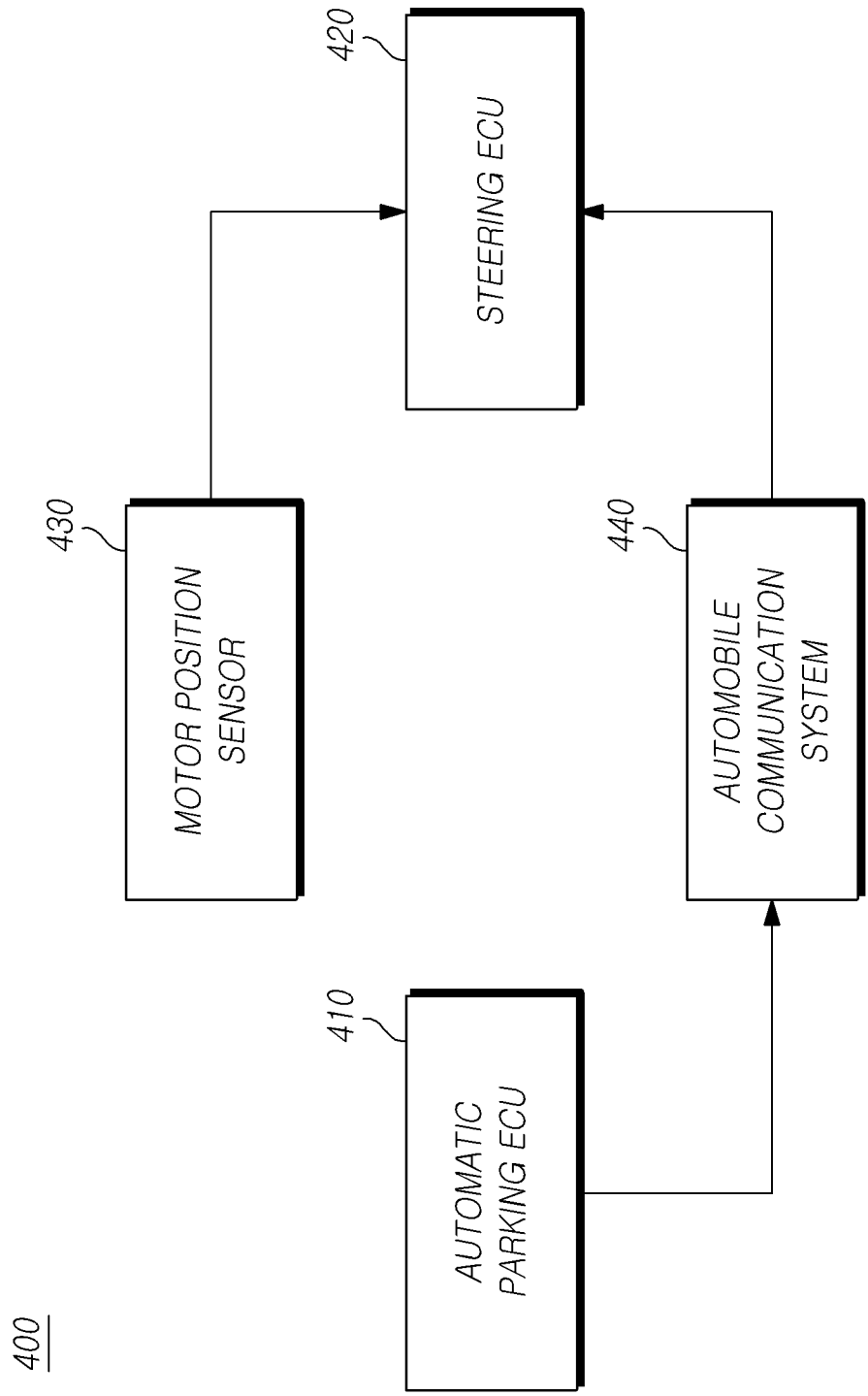
FIG. 4 is a block diagram for an automatic parking system in accordance with an embodiment of the present invention.

FIG. 4 is a block diagram for an automatic parking system 400 in accordance with an embodiment of the present invention, wherein referring to FIG. 4, the inventive automatic parking system 400 includes an automatic parking ECU 410 which outputs a reference angle, which is a target steering angle for automatic parking, at each reference angle input period; and a steering ECU 420 which receives a reference angle from the automatic parking ECU 410 through a controller area network (CAN), such as an automobile communication system, receives angular velocity calculated by a motor position sensor 430 at each angular input period, calculates the length of time elapsed until the angular velocity is input after the reference angle is input, calculates a calibrated reference angle obtained by calibrating the reference angle input from the automatic parking ECU 410 on the basis of the angular velocity and the reference angle, and conducting steering angle control on the basis of the calculated calibrated reference angle at each control period.

The steering ECU 420 may be or include the angle control apparatus 100 shown in FIG. 1 by way of an example.

According to the inventive automatic parking system 400, the steering ECU 420 calibrates the reference angle, which is a target steering angle input at each reference angle from the automatic parking ECU 410, to be smoother, and uses the calibrated reference angle, whereby the movement of a steering handle can be made smooth at the time of automatic parking, and hence the driver's satisfaction can be improved for automatic parking.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art can make various modifications, additions and substitutions without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. An angle control apparatus comprising:
an input unit which receives an input of a reference angle at each reference angle input period;
an angular velocity input unit which receives an input of a steering angular velocity calculated through a motor position sensor;
a reference angle calibrating unit which calculates the length of time elapsed until the steering angular velocity is input after the reference angle is input, and then calculates a calibrated reference angle obtained by calibrating the reference angle on the basis of the steering angular velocity and the length of elapsed time; and
an angle control unit which conducts angle control on the basis of the calculated calibrated reference angle, wherein the reference angle input unit receives an input of the reference angle, which is a target steering angle for automatic parking, at each reference angle input period from an automatic parking electronic control unit included in an automatic parking system.

2. The angle control apparatus as claimed in claim 1, wherein the reference angle calibrating unit calculates a compensation reference angle for compensating the reference angle by multiplying the steering angular velocity and the length of elapsed time, and calculates the calibrated reference angle by summing the reference angle and the compensation reference angle.

3. The angle control apparatus as claimed in claim 1, wherein a steering electronic control unit conducts angle control at each control period on the basis of the calibrated reference angle, wherein the steering angular velocity input period and the control period are calculated to be shorter than the reference angle input period by a predetermined value, on the basis of the angular steering velocity calculating velocity of the motor position sensor, and the angle control velocity of an angle control apparatus, respectively.

4. An angle control method comprising:
a reference angle input step for receiving an input of a reference angle at each reference angle input period;
an angular velocity input step for receiving an input of a steering angular velocity calculated through a motor position sensor at each angular velocity input period;
a reference angle calibrating step for calculating the length of time elapsed until the angular velocity is input after the reference angle is input using a reference angle calibrating unit, and then calculating a calibrated reference angle obtained by calibrating the reference angle on the basis of the steering angular velocity and the length of elapsed time; and
an angle control step for conducting angle a steering control on the basis of the calibrated reference angle.

5. An automatic parking system comprising:
an automatic parking electronic control unit which outputs a reference angle, which is a target steering angle for automatic parking, at each reference angle input period; and
a steering electronic control unit which receives a reference angle, and receives angular velocity calculated through a motor position sensor at each angular input period, wherein the steering electronic control unit calculates the length of time elapsed until the angular velocity is input after the reference angle is input, calculates a calibrated reference angle obtained by calibrating the reference angle on the basis of the angular velocity and the reference angle, and conducts steering angle control on the basis of the calibrated reference angle.

* * * * *